United States Patent
Völcker et al.

(10) Patent No.: US 12,322,002 B2
(45) Date of Patent: Jun. 3, 2025

(54) SIGNED VIDEO DATA WITH LINKED HASHES

(71) Applicant: Axis AB, Lund (SE)

(72) Inventors: Björn Völcker, Lund (SE); Stefan Lundberg, Lund (SE)

(73) Assignee: Axis AB, Lund (SE)

( * ) Notice: Subject to any disclaimer, the term of this patent is extended or adjusted under 35 U.S.C. 154(b) by 427 days.

(21) Appl. No.: 17/881,983

(22) Filed: Aug. 5, 2022

(65) Prior Publication Data

US 2023/0112135 A1    Apr. 13, 2023

(30) Foreign Application Priority Data

Oct. 7, 2021 (EP) ..................................... 21201362

(51) Int. Cl.
*G06T 1/00* (2006.01)
*H04L 9/32* (2006.01)
*H04N 19/50* (2014.01)

(52) U.S. Cl.
CPC .......... *G06T 1/0021* (2013.01); *H04N 19/50* (2014.11); *G06T 2201/0053* (2013.01)

(58) Field of Classification Search
CPC .......... G06T 1/0021; G06T 2201/0053; H04N 19/50; H04N 19/159; H04N 19/172; H04N 19/46; H04N 19/467; H04N 19/65; H04N 21/435; H04N 21/44008; H04N 21/835; H04N 21/8352; H04N 21/8358;
(Continued)

(56) References Cited

U.S. PATENT DOCUMENTS 6,996,717 B2 *  2/2006  Yin ...................... H04N 19/467
                                                          713/168
9,330,426 B2 *  5/2016  Davis ..................... H04N 19/61
(Continued)

FOREIGN PATENT DOCUMENTS

| EP | 1879390 A2 | 1/2008 |
| EP | 1879390 A3 | 11/2009 |
| JP | 2019-032739 A | 2/2019 |

OTHER PUBLICATIONS

Lu, Jian, "Video fingerprinting for copy identification: from research to industry applications." Electronic Imaging (2009).
(Continued)

*Primary Examiner* — Siamak Harandi
(74) *Attorney, Agent, or Firm* — Volpe Koenig

(57) ABSTRACT

A method of signing prediction-coded video data, comprising: obtaining a coded video sequence including at least one I-frame (I), which contains independently decodable image data, and at least one predicted frame (P1, P2, P3, P4), which contains image data decodable by reference to at least one other frame; generating a fingerprint ($H_I$) of each I-frame; generating a fingerprint ($H_P$) of each predicted frame by hashing a combination of data derived from the predicted frame and data derived from an I-frame to which the predicted frame refers directly or indirectly, wherein the fingerprint of the predicted frame is independent of any further predicted frame to which the predicted frame refers directly or indirectly; and providing a signature of the video sequence including the generated fingerprints.

15 Claims, 4 Drawing Sheets

(58) Field of Classification Search
CPC ............ H04N 21/235; H04N 21/2347; H04N 21/4405; H04L 9/3239; H04L 63/123; H04L 9/3247; H04L 9/50; H04L 9/0643; H04L 9/3236; G06F 16/783; G06F 21/64; G06F 16/683; G06V 20/46
See application file for complete search history.

(56) References Cited

U.S. PATENT DOCUMENTS

| | | |
|---|---|---|
| 2011/0078459 A1 | 3/2011 | Yoshioka et al. |
| 2011/0302419 A1 | 12/2011 | Yoshioka et al. |
| 2014/0010366 A1 | 1/2014 | Quinn et al. |
| 2019/0103975 A1 | 4/2019 | Jacobs et al. |
| 2019/0320198 A1* | 10/2019 | Zhao ............... H04N 19/70 |
| 2020/0044855 A1* | 2/2020 | Winarski ............ H04N 21/835 |
| 2021/0089683 A1 | 3/2021 | Hemlin Billstrom et al. |

OTHER PUBLICATIONS

Extended European Search Report dated Apr. 25, 2022 for European Patent Application No. 21201362.7.

* cited by examiner

SIGNED VIDEO DATA WITH LINKED HASHES

FIELD OF INVENTION

The present disclosure relates to the field of security arrangements for protecting programs or data against unauthorised activity. In particular, it proposes methods and devices for signing prediction-coded video data.

TECHNICAL BACKGROUND

A video sequence is an ordered sequence of video frames, and a video frame is made up of pixels. If a common scene is being imaged, the consecutive video frames will be strongly correlated. The ability to predict one video frame given past frames is an underlying assumption of prediction coding. Prediction coding may be described as a data compression technique specifically adapted for video data.

FIG. 1A illustrates a segment of a prediction-coded video sequence composed of I-frames and P-frames. An I-frame is a data structure with independently decodable image data, which can be decoded into a plaintext video frame (or a block of a video frame) by means of a predefined associated decoding operation. A P-frame, for its part, is a data structure whose associated decoding operation makes reference not only to the image data of the P-frame itself but also to at least one other I- or P-frame. Conceptually, and somewhat simplified, the image data in a P-frame expresses the change or movement relative to the video frame that its preceding I- or P-frame encodes. If the decoding operations are successful, video frames decoded from P-frames and I-frames are in general indistinguishable.

The inter-frame dependencies are indicated in FIG. 1A as arc-shaped arrows oriented in the negative time direction, t. In the depicted simple example, each P-frame refers to the immediately preceding I- or P-frame. If the first P-frame refers to a second P-frame, the second P-frame necessarily refers to at least one further I- or P-frame. In the present disclosure, the first P-frame will be said to refer directly to the second P-frame and to refer indirectly to the at least one further I- or P-frame. Because the image data in an I-frame is independently decodable, the chain of references (arc-shaped arrows) does not continue past an I-frame. The combination of an I-frame and the subsequent P-frames which refer to the I-frame directly or indirectly can be referred to as a group of pictures (GOP). Four GOPs are indicated in FIG. 1A: IPP, IPPPP, IPPP, IPPP.

FIG. 1B illustrates two further developments of inter-frame prediction, where inter-frame dependencies are again indicated by arc-shaped arrows. In addition to the forward-predicted P-frame structure, a bidirectionally predicted B-frame is used. The underlying bidirectional prediction operation may include interpolation between the referenced frames, such as smoothing. It is furthermore seen in FIG. 1B that a P-frame can refer to a I-, P- or B-frame that need not be immediately preceding but can be two or more steps away. The video sequence IBBPBBIBBPBBI shown in FIG. 1B may be characterized as a GOP since it can be decoded without reference to any other I-, P- or B-frames. Recommendation ITU-T H.264 (06/2019) "Advanced video coding for generic audio-visual services", International Telecommunication Union, specifies a video coding standard in which both forward-predicted and bidirectionally predicted frames are used.

Digital signatures provide a layer of validation and security to digital messages that are transmitted through a non-secure channel. By means of the digital signature, the authenticity or integrity of the message can be validated, and non-repudiation can be ensured. It goes without saying that video data, as a special case, can be digitally signed. However, there are considerable efficiency gains to be had by treating the video data not as a generic bit pattern but instead exploiting the frame structure. For example, the signing becomes computationally more tractable—but equally safe in general—if applied to a fingerprint of the video data rather than the video data itself. The use of frame-wise fingerprints $H_I$, $H_P$ is illustrated in the lower part of FIG. 1A, where each fingerprint may be a hash of that video frame's image data or a hash of that video frame's image in combination with optional further information. Signatures S1, S2, S3, S4 for the GOPs are obtained by digitally signing a combination of the fingerprints in that GOP. The security of the video sequence is further protected from unauthorized replacement, removal or insertion of full GOPs if the I-frame fingerprints $H_I$ are signed both as part of its own GOP and as part of the preceding GOP's signature, as illustrated in FIG. 1A. It is noted that straight downward arrows in the upper row represent the hash function, and the arrows in the lower row represent digital signing.

US20190103975 discloses a method of digitally signing data added to an initial plurality of unique data items. All of the data items are converted via a one-way function to respective equal length unique digests (or hashes), and the hashes are stored as a linked dataset in which the value of each successive hash is dependent on the value of the previous hash combined with a new hash resulting from the hashing of the most recently added data. The most recent hash in the linked dataset (hash chain) is the cumulative result of all previous hashes in their original sequence, and each hash in the dataset is unique to the most recently added data. Each cumulative hash is constructed by incorporating one or more pre-existing cumulative hashes into the source data before the new hash is calculated.

While the linked structure of a hash chain according to US20190103975 may protect against attempts by unauthorized parties to replace or remove data items or insert unauthentic data items, these teachings are not immediately suitable for signing prediction-coded video data, i.e., where each "data item" is a video frame. Indeed, as a result of the inter-frame dependencies, it will have to be tolerated that one non-verifiable frame fingerprint will lead to the non-verifiability of the fingerprints of one or more further video frames, even if these video frames can be successfully decoded and are associated with fingerprints of their own. All subsequent frames in the GOP become 'false negatives' if an IPP . . . PP format is used, and the impact may be even more significant in coding formats where B-frames are used.

Similarly, U.S. Pat. No. 6,996,717 discloses a specific way of using a hash function to compute linked watermarks of I-frames and two types of predicted frames in a video sequence. The frame data of each predicted frame is combined with the hash of a preceding frame prior to hashing. Accordingly, the hash of a later predicted frame (B) is computed from a combination of the predicted frame's frame data and the hash of an earlier predicted frame (P).

A related approach is illustrated in FIG. 2. The arc-shaped arrows above the video sequence indicate inter-frame dependencies, and the d operation represents decoding. Using a predefined hash function h, the following fingerprints are computed by the sender: $H_I = h(I)$, $H_{P1} = h([I, P1])$, $H_{P2} = h([P1, P2])$, $H_{P3} = h([P2, P3])$ and $H_{P4} = h([P3, P4])$, where [ ] denotes data concatenation. With this linking setup, if the recipient is unable to verify the fingerprint of the nth P-frame, then the nth P-frame shall be considered unauthentic, so that it also cannot be used for recomputing the fingerprints of the (n+1)th P-frame. As such, the recipient has no way to validate the authenticity of the (n+1)th P-frame even assuming that it could be successfully decoded. In a variation of the hash linking setup illustrated in FIG. 2, the following fingerprints are computed by the sender: $H_I=h(I)$, $H_{P1}=h([H_I, P1])$, $H_{P2}=h([H_{P1}, P2])$, $H_{P3}=h([H_{P2}, P3])$ and $H_{P4}=h([H_{P3}, P4])$. Then, if the recipient is unable to verify the fingerprint of the nth P-frame, the nth P-frame shall not be used for recomputing the fingerprints of the (n+1)th and following P-frames, and the recipient has no way to validate the authenticity of the (n+1)th and following P-frames even if they turn out to be decodable.

These examples illustrate the shortcomings of available methods for digitally signing prediction-coded video data.

SUMMARY

The present disclosure makes available methods and devices for signing (digitally signing) prediction-coded video data with a mechanism protecting against unauthorized replacement, removal or insertion of video frames. Proposing such methods and devices allowing fine-grained signature verification. It is desirable for the associated signature verification process to have a limited exposure to error propagation and false negatives in particular. Still further proposed are methods and devices that are suited for video coding formats with unidirectionally (forward) predicted frames and/or bidirectionally predicted frames, and computationally efficient signing techniques with the above characteristics.

At least some objectives are achieved by the present disclosure as defined by the independent claims. The dependent claims relate to advantageous embodiments of the disclosure.

In a first aspect of the disclosure, there is provided a method of signing prediction-coded video data. The method comprises: obtaining a coded video sequence including at least one I-frame, which contains independently decodable image data, and at least one predicted frame, which contains image data decodable by reference to at least one other frame; generating a fingerprint $H_I$ of each I-frame; generating a fingerprint $H_P$ of each predicted frame by hashing a combination of data derived from the predicted frame and data derived from an I-frame to which the predicted frame refers directly or indirectly, wherein the fingerprint of the predicted frame is independent of any further predicted frame to which the predicted frame refers directly or indirectly; and providing a signature of the video sequence including the generated fingerprints.

In this disclosure, it is understood that a "fingerprint" of a data item can be obtained by hashing the data item or by a performing a different operation on the data item or a subset thereof, which is possibly combined with other data. The data item may be image data which encodes a video frame. As used herein, further, the term "predicted frame" refers to a unidirectionally or bidirectionally predicted frame, such as the P- and B-frame discussed above. The terms "I-frame" and "predicted frame" refer to the image data (i.e., code), not the plaintext video frames that these data structures encode. As such, even strongly correlated consecutive plaintext video frames can be encoded into I-frames and predicted frames that lack a corresponding correlation. In any event, the teaching that the fingerprint of the predicted frame shall be independent of any further predicted frame to which the predicted frame refers is to be understood such that the predicted frame's fingerprint is both independent of the image data of the further referenced frames and independent of the fingerprints of the further referenced frames. The teaching may as well be understood to mean that the fingerprint of the predicted frame is generated without introducing any dependence on the image data or fingerprints of the further referenced frames. Indeed, the fingerprint of the predicted frame is generated by means of a hashing operation whose input does not include data derived from such further referenced frames.

An advantage of the signing method according to the first aspect of the disclosure is that if a fingerprint of a predicted frame cannot be verified by the recipient—as a result of fraudulent manipulation or because of a transmission error—this will only affect the predicted frame itself. Indeed, the predicted frame that lacks a verifiable fingerprint may be discarded or withheld from playback. Then again, since the fingerprint of the predicted frame is independent of any further predicted frame to which the predicted frame refers directly or indirectly, the recipient remains enabled to restore other frames of the video sequence and validate their authenticity normally. Accordingly, the present disclosure may eliminate the propagation problem ('false negatives') in the prior art without introducing new vulnerabilities. Indeed, if an unauthorized party removes or reorders frames, the chain of references back to the I-frame will be corrupted and no successful decoding possible. Furthermore, an unauthorized manipulation of the I-frame will be noticeable indirectly through the fingerprints of all predicted frames that refer to it; this increases the probability that such manipulation is discovered.

In one embodiment, the data derived from the predicted frame includes the image data of the predicted frame. Optionally, the data may further include a cryptographic salt. This embodiment may reduce the total number of hash operations in the implementation.

In one embodiment, the data derived from the predicted frame includes a hash of at least the predicted frame's image data. Especially, a hash of a combination of the image data and a cryptographic salt can be utilized. It is recalled, on the one hand, that a hash is a much smaller data set than the image data of a typical video frame and, on the other hand, that two data items are generally concatenated by being moved to a common memory space. On this basis, the present embodiment allows the predicted frame's fingerprint to be generated after just a lightweight memory operation that concatenates the hash of the image data of the predicted frame and the data derived from the I-frame.

In one embodiment, the data derived from the I-frame is the fingerprint $H_I$ of the I-frame. This is to say, the hash chaining operation and the signing of the video sequence both use the same fingerprint for the I-frame. This simplifies the implementation of the method and may reduce the degree of computational duplication.

The respective fingerprints $H_I$, $H_P$ of the I-frame and the predicted frame can be generated using a same or two different hash functions. In one embodiment, the fingerprint $H_I$ of the I-frame is generated using a relatively safer hash function (e.g., 1024 bits) and the fingerprint $H_P$ of the predicted frame is generated using a relatively simpler hash function (e.g., 256 bits) which has a lower computational cost. If the fingerprint $H_P$ of the predicted frame is dependent on the fingerprint of the I-frame, it can be generated in a computationally lean manner using a simpler hash function without lowering the overall safety level significantly.

In one embodiment, the data derived from the I-frame is cached, for reuse in generating fingerprints of a different predicted frame that refers directly or indirectly to the same I-frame. This avoids duplication and thus reduces the total computational effort.

In one embodiment, the fingerprint of the predicted frame is generated by hashing a combination that further comprises data derived from an additional I-frame to which the predicted frame refers directly or indirectly. The I-frame and the additional I-frame may belong to a same or two different GOPs. For example, the predicted frame may be a bidirectionally predicted frame which refers to two different I-frames; in this embodiment, data derived from both these I-frames may be included in the combination which is hashed to generate the fingerprint of the predicted frame. It is noted that the linking of the predicted frame's fingerprint to both these I-frames does not introduce a new error scenario; indeed, if the fingerprint of any of the I-frames cannot be verified at the recipient side, the decoding of the predicted frame will fail anyhow since the chain of references back to that I-frame is corrupted.

In some embodiments, the signature of the video sequence consists of multiple sub-signatures, which are provided for different segments of the video sequence. This allows continuous signature verification during playback. It also supports the signing of video data encoding a live video stream, which is particularly useful in video monitoring applications. The sub-signatures may be included in metadata of the video sequence.

In one embodiment, separate sub-signatures are provided for separate GOPs. A sub-signature of a GOP may include the fingerprints of the frames of that GOP and additionally a fingerprint of a frame (e.g., an I-frame) in an adjacent (e.g., a subsequent) GOP. This protects the signed video sequence from unauthorized replacement, removal or insertion of GOPs.

In a second aspect of the disclosure, there is provided a device arranged to perform the above method. Broadly speaking, the second aspect of the disclosure shares the effects and advantages of the first aspect, and it can be implemented with a corresponding degree of technical variation.

The disclosure further relates to a computer program containing instructions for causing a computer to carry out the above method. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the disclosure are shown. These aspects may, however, be embodied in many different forms and should not be construed as limiting; rather, these embodiments are provided by way of example so that this disclosure will be thorough and complete, and to fully convey the scope of all aspects of the disclosure to those skilled in the art. Like numbers refer to like elements throughout the description.

Figure 5:
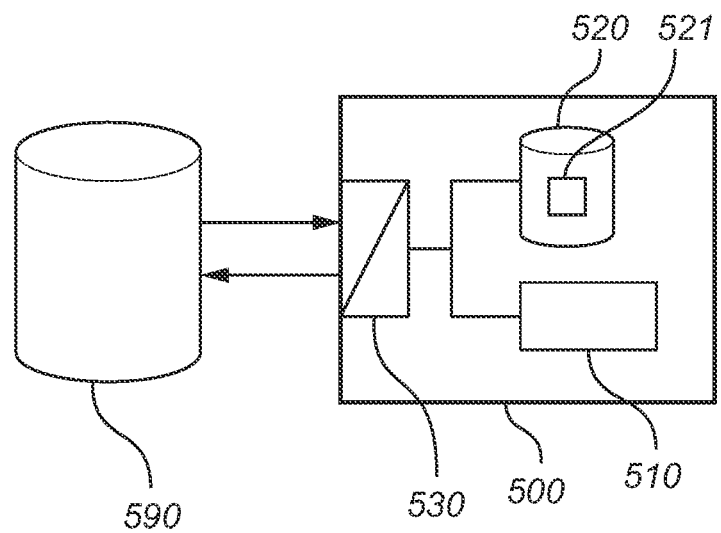
FIG. 5 shows a device arranged to perform signing of prediction-coded video data, according to an embodiment of the disclosure.
Figure 6:
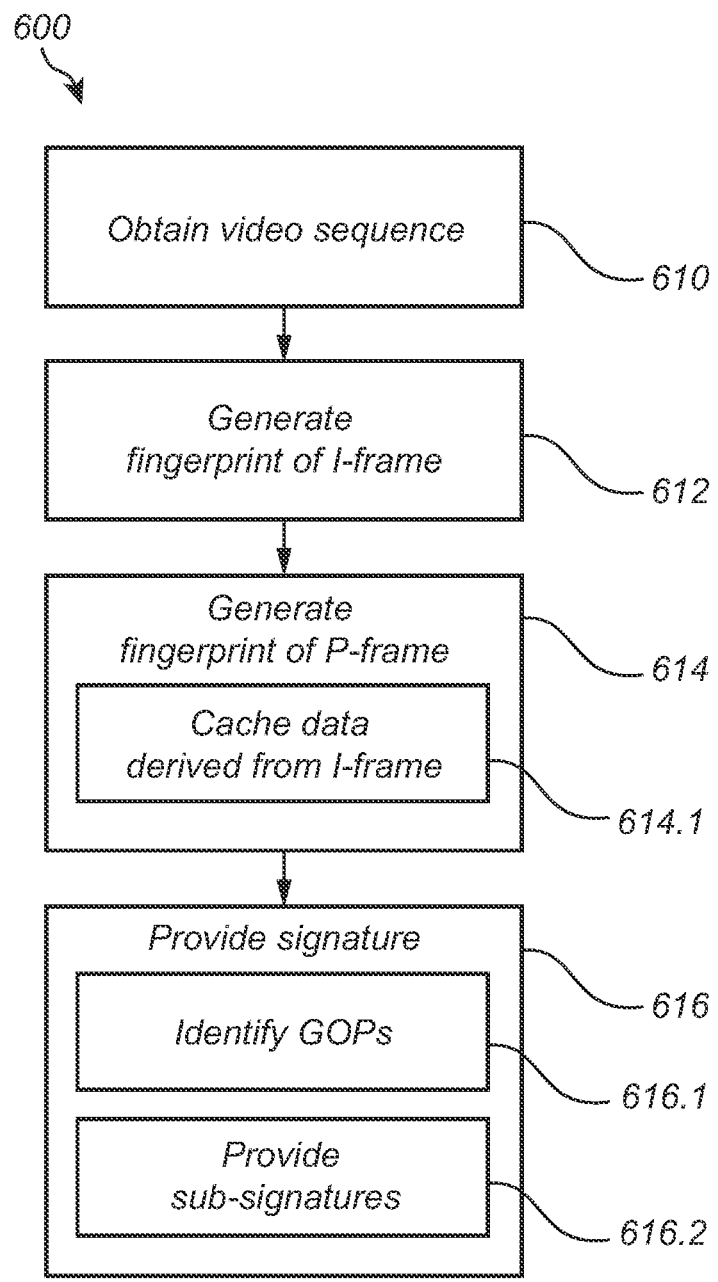
FIG. 6 is a flowchart of a method for signing prediction-coded video data, according to an embodiment of the disclosure.

With reference to FIG. 6, a method 600 of signing prediction-coded video data will be described. The method 600, which provides a signature on the basis of a coded video sequence, may be carried out by a suitably arranged generic programmable computer (e.g., with the relevant input and output interfaces) and, in particular, by means of the device 500 depicted in block-diagram form in FIG. 5. The device 500 comprises processing circuitry 510, a memory 520 and an input—output interface 530 which is adapted for bidirectional communication with an external memory 590 which stores, during some operational phases, the coded video sequences to be signed. The device 500 and the external memory 590 may be owned and operated by different entities, as is the case when the signing is provided as an external service, or by a common entity. The (internal) memory 520 of the device 500 may be suitable for storage of a program 521 with software instructions for carrying out the method 600, cryptographic information (e.g., private keys) for generating signatures, as well as logs, configuration files and data supporting various internal housekeeping procedures. The device 500 may be provided as a local computer or server, or it may be implemented in a distributed fashion on the basis of networked (cloud) processing resources. In particular, the device 500 may be integrated in a digital video camera, such as a video camera adapted for a monitoring application.

In a first step 610 of the method 600, a coded video sequence is obtained. The video sequence includes at least one I-frame, which contains independently decodable image data, and at least one predicted frame, which contains image data decodable by reference to at least one other frame. The I-frame and predicted frame are not to be confused with the plaintext video frames that these data structures encode. It is understood that the predicted frames may include unidirectionally predicted frames, bidirectionally predicted frames or a mixture of both types. The act of obtaining the video data may include gaining access to a memory where the video data is stored (e.g., the external memory 590 in FIG. 5), downloading the video data, and/or receiving a transmission with the video data. The video sequence may be coded in any suitable format, such as ITU-T H.265, AV1 and the already mentioned ITU-T H.264.

In a second step 612, a fingerprint $H_I$ of each I-frame is generated. The fingerprint $H_I$ of each I-frame can for example be a hash of the image data of the I-frame or a hash of a subset thereof. The fingerprint $H_I$ may be temporarily stored in anticipation of the method's 600 fourth step 616.

In a third step 614, a fingerprint $H_P$ of each predicted frame is generated by hashing a combination of data derived from the predicted frame and data derived from an I-frame to which the predicted frame refers directly or indirectly. However, the fingerprint of the predicted frame is independent of any further predicted frame to which the predicted frame refers directly or indirectly. This independence allows a recipient of the signed video data to decode predicted frames and validate their authenticity even when the recipient is unable to verify the fingerprint of an adjacent predicted frame. (For simplicity of this presentation, it is assumed that the non-verifiability of the fingerprint is the only anomaly.) The fingerprint computation may be expressed as $$H_P = h(\{\lambda, \pi\}),$$

where h is a hash function, λ is the data derived from the I-frame and π is the data derived from the predicted frame. The hash function (or one-way function) may be a cryptographic hash function that provides a safety level considered adequate in view of the sensitivity of the video data to be signed and/or in view of the value at stake if the video data is manipulated by an unauthorized party. Three examples are SHA-256, SHA3-512 and RSA-1024. The hash function shall be predefined (e.g., it shall be reproducible) so that the fingerprints can be regenerated when the fingerprint is to be verified. The curly brackets notation { } refers to a generic data combination operation, which may include concatenating the data linearly (juxtaposition) or in various staggered arrangements. The combination operation may further include an arithmetic operation on the data, such as bitwise OR, XOR, multiplication, division or a modulo operation.

Example choices of λ, π will now be described. In one implementation of the third step 614, the data derived from the predicted frame is the image data of the predicted frame. In other words, the fingerprint of an nth predicted frame is given by $$H_{Pn} = h(\{\lambda, Pn\}),$$

where Pn denotes the image data of the nth predicted frame. The combination may further comprise additional information σ:

$$H_{Pn} = h(\{\lambda, Pn, \sigma\}),$$

where σ may be a cryptographic salt of the type which has been used in the prior art to render duplicate or common security codes (e.g., passwords, signatures) less identifiable. In particular, the presence of the salt may stop an unauthorized party from guessing what hash function is being used. It is known that potentially useful salts include a value of an active internal counter, a random number, and a time and place of signing. Furthermore, the fingerprint of the nth predicted frame can be based on a subset of the image data of the first predicted frame, wherein the subset is extracted in a pre-agreed manner to allow it to be repeatable at the recipient side. Indeed, instead of image data Pn that encodes the full nth predicted frame, one may use image data coding only a certain image band or a certain macroblock of the video frame, according to a predefined segmentation which applies across frames, and which may be unchanged for the duration of the video sequence. In place of a cryptographic salt or in addition to it, the additional information σ may include the sequence number n of the frame, whereby unauthorized frame removal and frame reordering become discoverable.

In another implementation of the third step 614, the data derived from the predicted frame includes a hash of at least the predicted frame's image data:

$$H_{Pn} = h(\{\lambda, h(Pn)\}).$$

In variations of this implementation, the inner and outer hashing operations can be performed using different hash functions. In computing systems where voluminous memory operations are costly, this implementation has the advantage that the hash h(Pn) is a dataset of a manageable size which contributes negligibly to the cost of forming the combination {λ, h(Pn)}, e.g., by transferring it to a memory space where the processing circuitry 510 can retrieve input data to arithmetic operations.

In still further implementations of the third step 614, which are freely combinable with the two options just described, the data derived from the I-frame is the fingerprint of the I-frame:

$$H_P = h(\{H_I, \pi\}).$$

Figure 3:
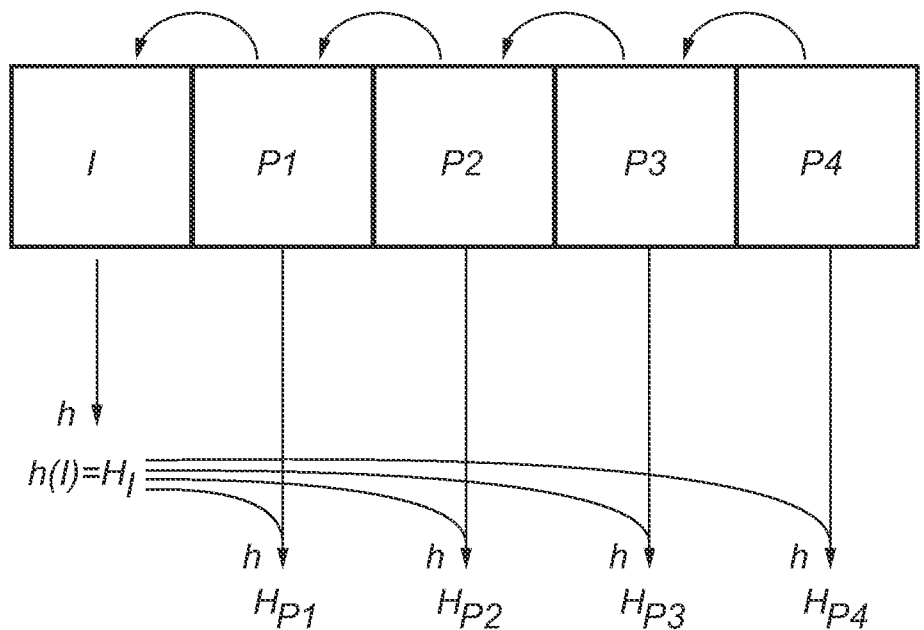
FIGS. 3 and 4 illustrate data flows in certain methods of signing prediction-coded video data, according to embodiments of the disclosure.
Figure 4:
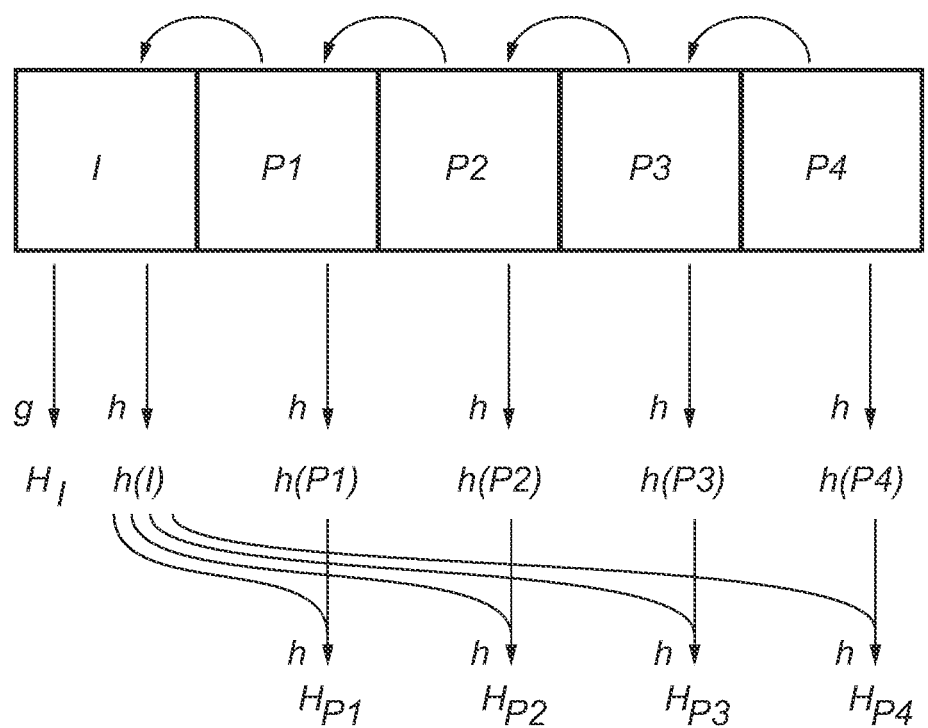

An embodiment where this choice of λ is combined with π=Pn is illustrated in FIG. 3. According to a variation, the data derived from the I-frame is a hash of the I-frame's image data I, but this hash is not identical to the fingerprint $H_I$ of the I-frame which was generated in the second step 612 and will be used later to provide the signature. On the one hand, the fingerprint $H_I$ of the I-frame may be generated using a different, possibly more complex hash function g. FIG. 4 shows an example of this setup where π=h(Pn). On the other hand, alternatively or additionally, the fingerprint $H_I$ of the I-frame may be generated by hashing a combination of the I-frame's image data and additional information, such as a cryptographic salt. A still further option is to generate the fingerprint $H_I$ by hashing a combination of a hash of the I-frame's image data and additional information. For the fingerprinting, one may use the entirety of the I-frame's image data or an extracted subset of image data which codes a certain image band or block, as described above for predicted frames.

Common to all of the above options for implementing the third step 614 of the method 600, it is advantageous to cache 614.1 the data λ derived from the I-frame temporarily, for later reuse when the third step 614 is executed anew to generate fingerprints of a different predicted frame that refers directly or indirectly to the same I-frame.

A further development of the third step 614 specifically handles the case where a predicted frame refers directly or indirectly to two I-frames. The fingerprint of the predicted frame is then generated based on a combination of data $\lambda_1$, $\lambda_2$ derived from both of these I-frames, in addition to the data π derived from the predicted frame itself:

$$H_P = h(\{\lambda_1, \lambda_2, \pi\}).$$

The execution of the method 600 goes on to a fourth step 616 of providing a signature of the video sequence including the generated fingerprints. The signature may be formed by collecting the generated fingerprints in a so-called document (a text file or another data structure) and signing the document. The document signature may for example be generated by asymmetric cryptography, i.e., using a private key from a key pair in which the public key has been pre-shared with the recipient such that the recipient is able to verify the signature. Accordingly, the signature of the video sequence may consist of the document and the document signature. A recipient in possession of video data which has been signed in this manner can validate its authenticity by the following procedure:

1. attempting to verify the document signature;
2. if the document signature is successfully verified, attempting to verify the fingerprints in the document;
3. if all fingerprints in the document are successfully verified, concluding that the video data is authentic (validation).

Typically, the verification in step 2 includes replicating a fingerprinting operation deemed to have been performed by the sender, i.e., recomputing the fingerprints. The verification in step 1, for its part, typically relates to an asymmetric signature setup, where signing and verification are distinct cryptographic operations corresponding to private/public keys. Other combinations of symmetric and/or asymmetric verification operations are possible without departing from the scope of the disclosure.

The fourth step 616 may include associating the signature with the video sequence.

For example, if the video data has a predefined data format that includes, in addition to the image data, metadata fields, then the signature may be associated with the video data by being placed in such a metadata field. In the ITU-T H.264 format, the signature may be included in a Supplemental Enhancement Information (SEI) message in the video bitstream. In the AV1 standard, the signature may be included in a Metadata Open Bitstream Unit (OBU). Alternatively, the fourth step 616 includes establishing an association between the video data and the signature outside the data format, e.g., by forming a data structure (container) which includes both the video data and the signature and in which the video data will be transmitted to the intended recipient. A still further option is to separate the video data from the signature, to allow the (smaller) signature to be transmitted over a safe communication path, whereas the (larger) video data can be transmitted over an arbitrary communication path. These alternatives to including the signature in a metadata field are advantageous in that they do not require the power to modify the video data (e.g., an authorization granted by the video data owner), and they can thus be executed by an entity without write access rights to the video data.

Figure 1A:
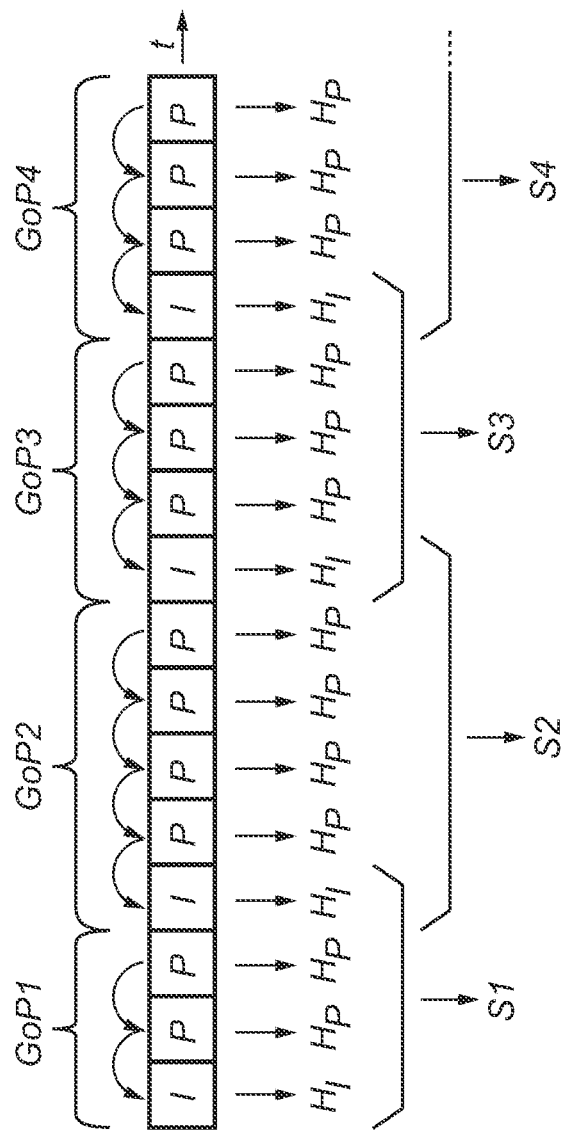
FIG. 1A shows a segment of a prediction-coded video sequence with accompanying frame-wise fingerprints and signatures generated from these.
Figure 1B:
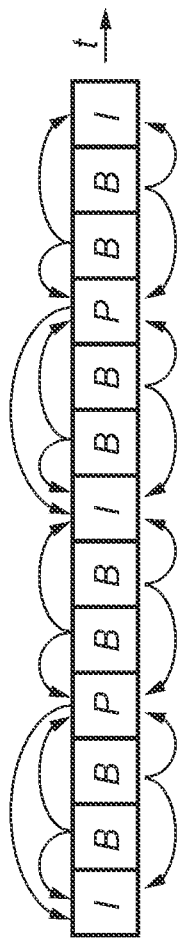
FIG. 1B shows a segment of a prediction-coded video sequence which further includes bidirectionally predicted frames.
Figure 2:
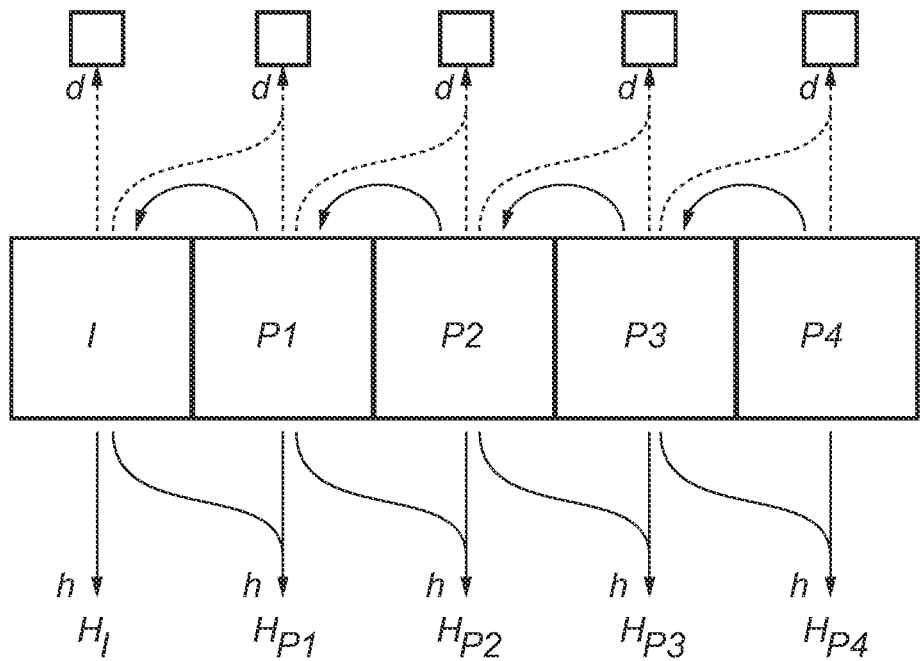
FIG. 2 illustrates data flows in hash-based computation (h) of chained fingerprints of prediction-coded video frames as well as a decoding operation (d)

In some embodiments, the fourth step 616 provides a signature which is composed of multiple sub-signatures, to allow continuous verification of the sub-signature in the course of a running decoding of the video data. For example, the video data can be provided 616 with one sub-signature for each GOP. Accordingly, the sub-signature may include the fingerprints of the frames in the GOP and, optionally, a fingerprint of a frame in a preceding or subsequent GOP. A sub-signature of this type may consist of a document collecting the mentioned fingerprints and a document signature. To make the unauthorized removal and unauthorized reordering within a GOP discoverable, it may be agreed between the sender and recipient that the order in which the fingerprints are enumerated in the document shall correspond to the authentic frame order. A still further option is to generate a single fingerprint of the fingerprints of all the frames in the GOP (with an optional fingerprint of a frame in an adjacent GOP, as illustrated in FIG. 1A), to sign the single fingerprint, and provide a signature of the video data that consist of the single fingerprint and its signature. Here, it may be considered that the single fingerprint is the document, or it may be considered that the single fingerprint supplements the document, which is itself empty. Reference is made to FIG. 1A and the accompanying explanations why this setup protects against unauthorized replacement, removal or insertion of GOPs.

To carry out GOP-level signing, the fourth step 616 may include the substeps of identifying 616.1 a plurality of GOPs, and providing 616.2 a sub-signature for each identified GOP. Specifically, a GOP-level sub-signature may be included in metadata of the first or last frame of the GOP, or the sub-signature may be inserted into the video bitstream in the vicinity of these frames.

The aspects of the present disclosure have mainly been described above with reference to a few embodiments. However, as is readily appreciated by a person skilled in the art, other embodiments than the ones disclosed above are equally possible within the scope of the disclosure, as defined by the appended patent claims.

The invention claimed is:

1. A method of signing prediction-coded video data, the method comprising:
   obtaining a coded video sequence including at least one I-frame, which contains independently decodable image data, and at least one predicted frame, which contains image data decodable by reference to at least one other frame;
   generating a fingerprint of each I-frame;
   generating a fingerprint of each predicted frame by hashing a combination of data derived from the predicted frame and data derived from an I-frame to which the predicted frame refers directly or indirectly; and
   providing a signature of the video sequence including the generated fingerprints,
   wherein the fingerprint of the predicted frame is generated by means of a hashing operation whose input does not include data derived from any further predicted frame to which the predicted frame refers directly or indirectly.

2. The method of claim 1, wherein said data derived from the predicted frame includes its image data.

3. The method of claim 1, wherein said data derived from the predicted frame includes a hash of at least the predicted frame's image data.

4. The method of claim 1, wherein said data derived from the I-frame is the fingerprint of the I-frame.

5. The method of claim 4, wherein the respective fingerprints of the I-frame and the predicted frame are generated using different hash functions.

6. The method of claim 1, further comprising caching said data derived from the I-frame for reuse in generating fingerprints of a different predicted frame that refers directly or indirectly to the same I-frame.

7. The method of claim 1, wherein the fingerprint of the predicted frame is generated by hashing a combination that further comprises data derived from an additional I-frame to which the predicted frame refers directly or indirectly.

8. The method of claim 1, wherein the signature of the video sequence is composed of multiple sub-signatures, and wherein providing the signature comprises:
   identifying a plurality of groups of pictures, GOPs, such that each group is independently decodable; and
   providing a sub-signature for each identified GOP.

9. The method of claim 8, wherein the sub-signature includes the fingerprints of the frames in the GOP and a fingerprint of a frame in an adjacent GOP, especially a fingerprint of a frame in a subsequent GOP.

10. The method of claim 1, wherein the signature is included in metadata of the coded video sequence.

11. The method of claim 1, wherein the signature of the video sequence is cryptographically signed.

12. The method of claim 1, which comprises generating a fingerprint of a unidirectionally predicted frame.

13. The method of claim 1, which comprises generating a fingerprint of a bidirectionally predicted frame.

14. A device comprising processing circuitry arranged to perform a method of signing prediction-coded video data, the method comprising:
   obtaining a coded video sequence including at least one I-frame, which contains independently decodable image data, and at least one predicted frame, which contains image data decodable by reference to at least one other frame;
   generating a fingerprint of each I-frame;
   generating a fingerprint of each predicted frame by hashing a combination of data derived from the predicted frame and data derived from an I-frame to which the predicted frame refers directly or indirectly; and
   providing a signature of the video sequence including the generated fingerprints,
   wherein the fingerprint of the predicted frame is generated by means of a hashing operation whose input does not include data derived from any further predicted frame to which the predicted frame refers directly or indirectly.

15. A non-transitory computer-readable storage medium having stored thereon instructions for implementing a method, when executed on a device having processing capabilities, the method of signing prediction-coded video data comprising:
   obtaining a coded video sequence including at least one I-frame, which contains independently decodable image data, and at least one predicted frame, which contains image data decodable by reference to at least one other frame;
   generating a fingerprint of each I-frame;
   generating a fingerprint of each predicted frame by hashing a combination of data derived from the predicted frame and data derived from an I-frame to which the predicted frame refers directly or indirectly; and
   providing a signature of the video sequence including the generated fingerprints,
   wherein the fingerprint of the predicted frame is generated by means of a hashing operation whose input does not include data derived from any further predicted frame to which the predicted frame refers directly or indirectly.

* * * * *